United States Patent
Pirkle et al.

(10) Patent No.: US 11,423,748 B2
(45) Date of Patent: Aug. 23, 2022

(54) SYSTEM AND METHOD FOR IDENTIFYING AND LOCATING SENSED EVENTS

(71) Applicant: Tyco Fire & Security GmbH, Neuhausen am Rheinfall (CH)

(72) Inventors: Wesley C. Pirkle, New Albany, OH (US); Benjamin J. Cote, Powell, OH (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 16/486,591

(22) PCT Filed: Apr. 6, 2018

(86) PCT No.: PCT/IB2018/052404
§ 371 (c)(1),
(2) Date: Aug. 16, 2019

(87) PCT Pub. No.: WO2018/185723
PCT Pub. Date: Oct. 11, 2018

(65) Prior Publication Data
US 2020/0020215 A1 Jan. 16, 2020

Related U.S. Application Data

(60) Provisional application No. 62/483,039, filed on Apr. 7, 2017.

(51) Int. Cl.
*G08B 13/16* (2006.01)
*G08B 25/00* (2006.01)
(Continued)

(52) U.S. Cl.
CPC ....... *G08B 13/1672* (2013.01); *G08B 25/007* (2013.01); *G08B 25/14* (2013.01);
(Continued)

(58) Field of Classification Search
None
See application file for complete search history.

(56) References Cited

U.S. PATENT DOCUMENTS 5,045,839 A * 9/1991 Ellis ............... G08B 21/0415
340/539.11
7,558,156 B2 * 7/2009 Vook .............. G08B 13/1672
367/906
(Continued)

FOREIGN PATENT DOCUMENTS

EP           1 806 952      7/2007
WO      WO 2014165459     10/2014

OTHER PUBLICATIONS

International Search Report and Written Opinion of the International Searching Authority, dated Jul. 13, 2018, from International Application No. PCT/IB2018/052404, filed on Apr. 6, 2018. 19 pages.
(Continued)

*Primary Examiner* — Muhammad Adnan
(74) *Attorney, Agent, or Firm* — HoustonHogle LLP

(57) ABSTRACT

Method and system for detecting multiple alarms triggered by the same event and suppressing the duplicate detections, reducing false alarm rate. The first sensor to be activated is identified via a timestamp associated to the activation, then it is identified whether the other sensors have been activated by the same event. In particular a plurality of microphones is deployed in separate rooms to detect gunshots from firearms in a indoor setting.

28 Claims, 6 Drawing Sheets

(51) Int. Cl.
  *G08B 25/14* (2006.01)
  *G08B 29/18* (2006.01)
  *H04L 12/18* (2006.01)
  *H04L 67/12* (2022.01)

(52) U.S. Cl.
  CPC ........ *G08B 29/185* (2013.01); *H04L 12/1895* (2013.01); *H04L 67/12* (2013.01)

(56) References Cited

U.S. PATENT DOCUMENTS

| | | | | |
|---|---|---|---|---|
| 7,751,282 | B2* | 7/2010 | Holmes | G01S 5/22 |
| | | | | 342/357.44 |
| 7,796,470 | B1* | 9/2010 | Lauder | G01S 5/28 |
| | | | | 367/127 |
| 8,493,223 | B2* | 7/2013 | Zadnikar | G08B 13/19697 |
| | | | | 356/213 |
| 8,660,110 | B2* | 2/2014 | Zakrzewski | H04W 56/009 |
| | | | | 370/350 |
| 8,676,930 | B2* | 3/2014 | Foisy | G08B 25/085 |
| | | | | 340/16.1 |
| 9,046,878 | B2* | 6/2015 | Zheng | G04G 7/02 |
| 9,057,582 | B2* | 6/2015 | Björkman et al. | F41G 3/2655 |
| 9,131,329 | B2* | 9/2015 | Kobylarz | H04W 4/50 |
| 9,747,497 | B1* | 8/2017 | Sharma | G06V 40/103 |
| 10,075,846 | B1* | 9/2018 | Acar | H04L 63/0861 |
| 10,134,422 | B2* | 11/2018 | Hwang | G01S 5/28 |
| 10,295,556 | B1* | 5/2019 | Paczkowski | G01N 35/00871 |
| 10,361,800 | B2* | 7/2019 | Daoura | H04L 67/10 |
| 10,873,519 | B2* | 12/2020 | Johannsen | H04L 43/106 |
| 11,164,211 | B2* | 11/2021 | Lien | G06Q 30/0267 |
| 2002/0167414 | A1* | 11/2002 | Kelly | G01F 23/2967 |
| | | | | 340/612 |
| 2006/0157206 | A1* | 7/2006 | Weik | E06B 9/82 |
| | | | | 160/188 |
| 2007/0159924 | A1* | 7/2007 | Vook | G08B 13/1672 |
| | | | | 367/127 |
| 2008/0165621 | A1* | 7/2008 | Fisher | F41H 13/00 |
| | | | | 367/118 |
| 2008/0174432 | A1* | 7/2008 | Ulrich | G06K 7/0008 |
| | | | | 340/572.1 |
| 2008/0219100 | A1* | 9/2008 | Fisher | F41H 13/00 |
| | | | | 367/129 |
| 2009/0120653 | A1* | 5/2009 | Thomas | A62C 5/02 |
| | | | | 169/61 |
| 2010/0171594 | A1* | 7/2010 | Bares | G06K 7/10475 |
| | | | | 340/10.2 |
| 2011/0025474 | A1* | 2/2011 | Kung | G06K 7/0008 |
| | | | | 340/10.51 |
| 2013/0202120 | A1* | 8/2013 | Bickel | G08B 13/1672 |
| | | | | 381/56 |
| 2014/0082099 | A1* | 3/2014 | Burns | H04L 67/26 |
| | | | | 709/206 |
| 2014/0293993 | A1* | 10/2014 | Ryhorchuk | H04L 43/16 |
| | | | | 370/350 |
| 2015/0070166 | A1* | 3/2015 | Boyden | G08B 13/1672 |
| | | | | 340/540 |
| 2015/0276829 | A1* | 10/2015 | Shamir | G01R 21/133 |
| | | | | 702/62 |
| 2016/0232774 | A1* | 8/2016 | Noland | G08B 25/10 |
| 2016/0260307 | A1 | 9/2016 | Skorpik et al. | |
| 2017/0004661 | A1* | 1/2017 | Winiecki | G07C 5/006 |
| 2017/0343644 | A1* | 11/2017 | Salmi | G01S 5/30 |
| 2018/0035374 | A1* | 2/2018 | Borden | H04W 28/0278 |
| 2018/0060893 | A1* | 3/2018 | Omer | G06V 20/52 |
| 2018/0068532 | A1* | 3/2018 | Jones | G06Q 30/0201 |
| 2018/0122506 | A1* | 5/2018 | Grantcharov | G16H 40/67 |
| 2018/0158305 | A1* | 6/2018 | Noland | G08B 13/1672 |
| 2018/0210437 | A1* | 7/2018 | Ashar | H04L 12/2816 |
| 2018/0284773 | A1* | 10/2018 | Pratt | G05D 1/005 |
| 2019/0121569 | A1* | 4/2019 | Sandholm | G06F 16/284 |
| 2020/0066130 | A1* | 2/2020 | Ten Kate | G06F 3/017 |

OTHER PUBLICATIONS

Anonymous, "InvenSense INMP621 Wide Dynamic Range Microphone with PDM Digital Output," 1-20 (2014).

Anonymous, "MP34DB01 MEMS Audio Sensor Omnidirectional Digital Microphone," 1-16 (2012).

International Preliminary Report on Patentability, dated Oct. 17, 2019, from International Application No. PCT/IB2018/052404, filed on Apr. 6, 2018. 12 pages.

International Application No. PCT/IB2018/052404, filed on Apr. 6, 2018. 12 pages.

* cited by examiner

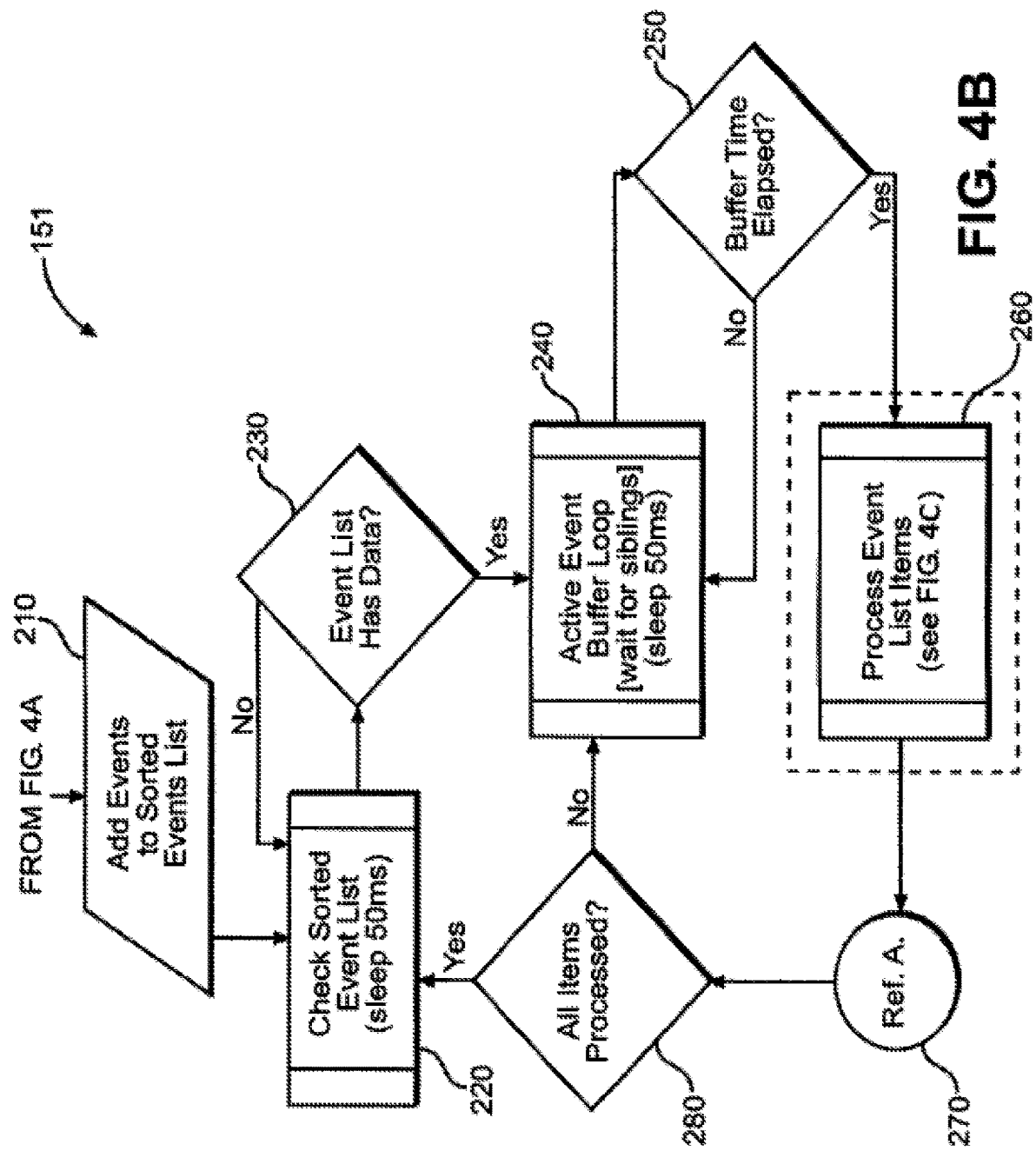

SYSTEM AND METHOD FOR IDENTIFYING AND LOCATING SENSED EVENTS

RELATED APPLICATIONS

This application is a § 371 National Phase Application of International Application No. PCT/IB2018/052404, filed on Apr. 6, 2018, now International Publication No. WO 2018/185723, published on Oct. 11, 2018, which International Application claims the benefit under 35 USC 119(e) of U.S. Provisional Application No. 62/483,039, filed on Apr. 7, 2017, both of which are incorporated herein by reference in their entirety.

FIELD OF THE INVENTION

The present invention pertains to the art of sensors and, more particularly, to a system and method employing sensors in connection with identifying the origin of an event.

BACKGROUND OF THE INVENTION

Sensor networks are currently deployed around the world to detect various events. For instance, certain events could be represented by a variety of threats, such as gunshots. The number of incidents involving criminals shooting victims in a building, such as a school or public mall, is increasing each year. Identifying and reacting quickly to such incidents can reduce loss of life. First responders need to know if gunshots have actually been fired and the location and number of shots fired by criminals who are doing the shooting.

In confined areas, such as in a school or a public building, detecting and locating the source of gunshots is a complicated problem. A gunshot typically generates several sounds including the gunshot itself, noise from bullet impacts and noise of reflected gunshot sounds. In addition, numerous noises are generated in buildings that may be mistakenly identified as gunshots.

The broad concept of detecting events utilizing acoustics is known. More specifically, it is known to provide a gunshot detecting system including an array of acoustic sensors positioned in a pattern. This pattern enables signals from the sensors to be employed to not only detect the firing of a gunshot but to also locate the origin of the shot. When installing acoustic sensors for the purpose of gunshot detection, precise placement is crucial for optimum detection. Detectors placed too sparsely will cause gaps in coverage while sensors placed too densely will cause redundant detections. With the variety of weapon types and calibers involved in most active shooter events, no one single sensor location can assure complete coverage with zero overlap. Often a compromise must be made. To achieve complete coverage, some amount of overlapping detection must occur. One main requirement of such a system is the need to accurately distinguish between the sound produced from a gunshot and a host of other ambient sounds.

In at least one known arrangement, a microphone is used to detect each sound, which is then amplified, converted to an electrical signal and then the electrical signal is compared with a threshold value above which a gunshot sound is expected to exceed. Specifically, indoor gunshot detection networks using acoustics may have multiple sensors signal or alarm on a single gunshot. If multiple sensors trigger an alarm for a single incident, confusion about the location and severity of the event may occur. Unfortunately, such systems are still not able to accurately and inexpensively determine the origin of the gunshot.

Similar problems are encountered in connection with other sensing systems, even those systems which are not concerned with threat situations. Regardless of the known arrangements in these fields, there is still seen to exist a need for a system and method for detecting the occurrence and location of sensed events which represents an improvement in terms of at least one or more of accuracy, dependability and effectiveness. In particular, an event detection system and method which provides for very low false alarms or false positives is needed, that at the same time provides for high detection rates. There is also a need to accurately determine where sensed events are located.

SUMMARY OF THE INVENTION

In general, the present invention describes a system and method for determining the order and number of detection events that occur in a dispersed sensor network. By way of example, in one preferred embodiment, a sensor network is employed to detect an event in the form of an audible signal. The event is time stamped to the millisecond and then sent over the network to a server. At the server, the event is evaluated as either a unique audible signal and displayed on a Graphical User Interface (GUI) or is determined to be a multiple detection of an audible signal already identified and therefore suppressed. Such a system helps eliminate confusion by using the sensor's time of alarm as a way to determine which sensor was activated first and then identify if other sensors are alarming on the same event. If multiple alarms for the same event are detected then these "extra" alarms are suppressed. With the sensor closest to the event identified and multiple alarms for a single event eliminated, a more coherent picture of the event can be presented, such as to first responders.

More generally, the system includes a communications network that allows all the sensors to send and receive messages. The system is also provided with a timeserver. The timeserver broadcasts a time message over the network to all of the sensors so that the sensors are all synchronized. In response to the sensors detecting/sensing an event such as a gunshot, each sensor generates a time stamp based upon the time messages received from the timeserver, and generates a time stamped signal that includes the time stamp. Therefore, the sensors can send a time stamped message to a central command and control unit when the sensors detect a requisite acoustic signature.

In a particular acoustic embodiment, two micro electro-mechanical system (MEMS) microphones having different sensitivity levels are employed for each sensor. Each sensor preferably includes a single board computer which is configured to sample the multiple MEMS microphones, such that outputs from the microphones can be continuously analyzed in near real time for an acoustic signature. Each sensor is also electrically powered and networked, thereby enabling output signals to be transferred remotely, to the command and control unit for additional processing or other purposes. The computer on each sensor is configured to receive a time message from a timeserver. In addition, the computer may include a timeserver for sending time messages to other sensors.

In accordance with an aspect of the invention, operation is accomplished by first synchronizing the sensors by broadcasting a time message over the network. Preferably, broadcasting the time message includes sending a User Datagram Protocol (UDP) multicast time message. The time message may be produced with the command control unit or one of the sensors functioning as a timeserver. Periodically, the operation includes verifying if the timeserver is functioning and, if the timeserver is not functioning, randomly assigning another one of the sensors to be the new timeserver.

Another preferred aspect of operation includes adding a time stamp to each signal generated by each sensor in response to a sensed event, to produce time stamped signals and adding a sensor identification mark to each signal indicating which sensor produced the signal. The signals are sent to the command and control unit which waits a nominal amount of time for the signals to arrive. Next, the command and control unit sorts the time stamped signals to determine which of the sensors first sensed the event, and determines a location of a source of the event based on a location of the sensor that first sensed the event. If two signals have time stamps that are close in time, secondary protocol has the command and control unit compare the amplitude of the two signals to determine which signal of the two acoustic signals has the largest amplitude. Therefore, in this scenario, the system determines the location of the source of the event based on location of the sensor producing the signal with the largest amplitude.

In an embodiment directed to a threat verification, a threat message is preferably produced to alert emergency personnel. Threshold levels can be selectively adjusted and set based on the acoustics of the building or other structure, as well as the sensor layout employed. In other embodiments an event, such as a car crash or argument, could be detected and, once again, emergency personnel could be notified. More generally, the system could also be employed with sensors used to detect motion, seismic events, smoke, fire and the like.

Additional objects, features and advantages of the present invention will become more readily apparent from the following detailed description of preferred embodiments when taken in conjunction with the drawings wherein like reference numerals refer to corresponding parts in the several views.

In general, according to one aspect, the invention features a system for locating a source of an acoustic event. The system includes sensors that communicate over a communications network, at least one timeserver, and a command and control unit. The at least one timeserver sends time messages over the network to synchronize the sensors. The sensors receive the time messages, sense the event and generate time stamped signals in response to sensing the event, the time stamped signals including time stamps based upon the time messages, and send the time stamped signals over the network. The command and control unit receives the time stamped signals over the network sent by the sensors, and locates the source of the event based on the time stamped signals sent by the sensors.

In one implementation, the timeserver is located within the command and control unit. In another implementation, the timeserver is located within one of the sensors. Preferably, the command and control unit is configured to determine if the timeserver is functioning, and when the timeserver is not functioning, randomly assigns another one of the sensors to be a new timeserver. In one example, the acoustic event is a gunshot.

Typically, the sensors are located in different rooms of a building, and each of the sensors include two micro electromechanical system (MEMS) microphones having different sensitivity levels.

In examples, the time stamped signals include identification marks that indicate which sensors generated the signals, and include amplitude information of the event sensed by the sensors.

In one implementation, the communications network has one or more subnets that each include one or more sensors, and the command and control unit selects one of the sensors within each of the subnets to be a timeserver within each of the subnets.

In general, according to another aspect, the invention features a method for locating a source of an acoustic event. The method includes at least one timeserver that sends time messages over a communications network to synchronize sensors on the network. Also according to the method, the sensors receive the time messages, sense the event, generate time stamped signals in response to sensing the event, the time stamped signals including time stamps based upon the time messages, and send the time stamped signals over the network. The method also includes a command and control unit that receives the time stamped signals sent over the network by the sensors, and locates the source of the event based on the time stamped signals sent by the sensors.

In one example, the command and control unit locates the source of the event based on the time stamped signals sent by the sensors, by: sorting the time stamped signals to determine which of the sensors first sensed the event; and locating the source of the event based on a location of the sensor that first sensed the event. The method can also send an alarm message for the sensor that first sensed the event, and suppress alarm messages for other sensors that sensed the event. Additionally, the method can configure the command and control unit to wait a nominal amount of time for the time stamped signals to arrive before sorting the time stamped signals.

In another example, the command and control unit locates the source of the event based on the time stamped signals sent by the sensors, by: determining that two of the signals have time stamps that are close in time; determining which of the two signals has a largest amplitude; and identifying a location of the sensor that produced the signal with the largest amplitude.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4B is a flowchart of an event queuing and processing algorithm in accordance with the invention.

DETAILED DESCRIPTION OF THE PREFERRED EMBODIMENTS

Figure 1:
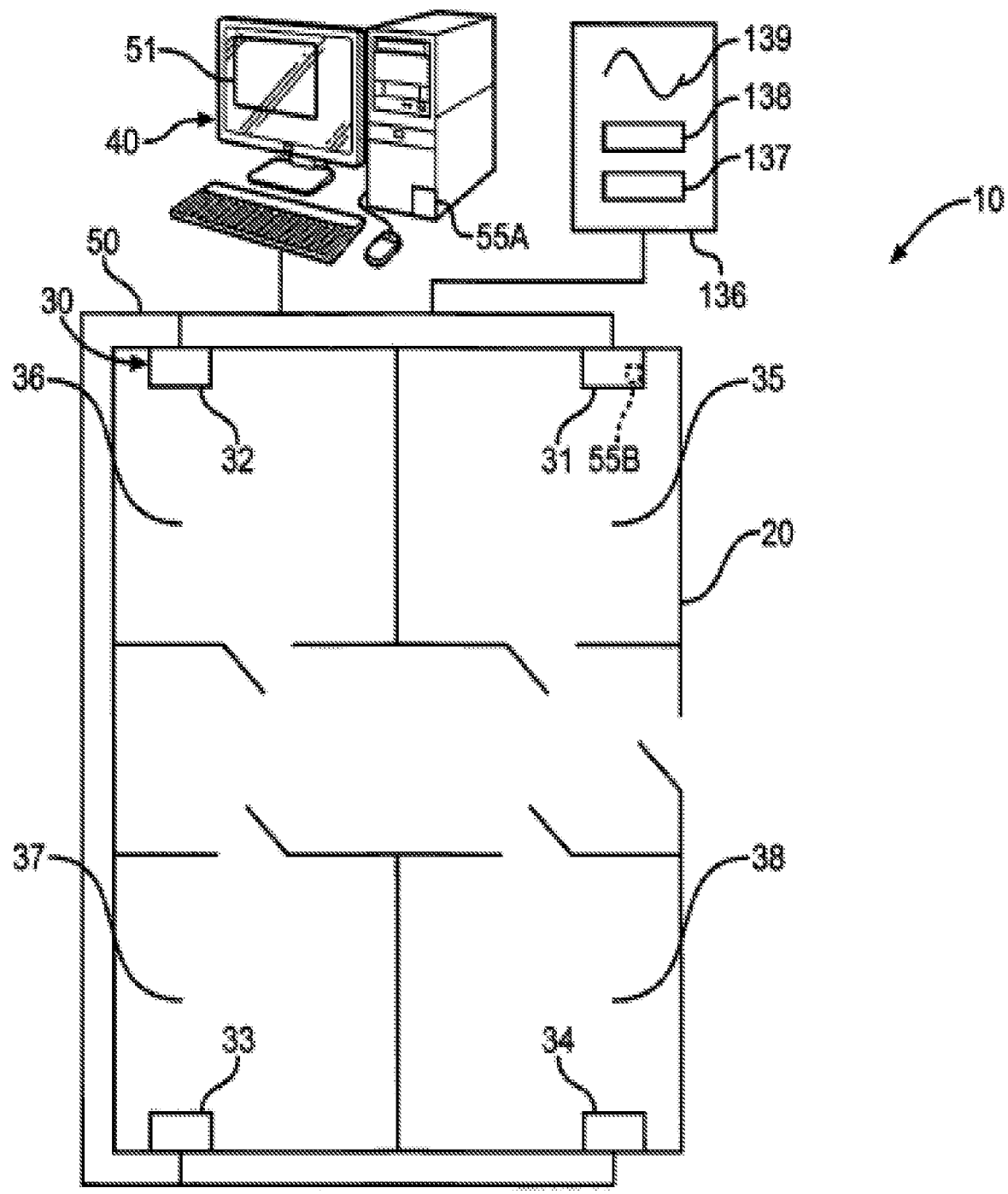
FIG. 1 schematically indicates an overall view of a detection system in accordance with a preferred embodiment of the invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The system for identifying and locating an event can be employed in connection with a variety of sensors, such as acoustic detectors, motion detectors, seismic detectors, smoke detectors etc. By way of example, and with initial reference to FIG. 1, a system 10 for sensing acoustic or audible signals, such as indoor gunshots, is shown installed within a building 20. A plurality of acoustic sensors 30 are arranged within building 20, with each sensor 31, 32, 33, 34 being shown within a respective room or area 35, 36, 37, 38 of building 20. The sensors 31, 32, 33, 34 are connected to a command and control unit 40 by a communications network 50. Preferably, the command and control unit 40 is a computer that monitors acoustic sensors 31, 32, 33, 34 and reports on, among other things, sensor status, alarms and faults. The sensor information is then presented to an operator through a graphical user interface (GUI) 51. The computer may be a laptop or desktop computer running server software. GUI 51 is displayed within an application embodying the methods described herein; however, other control and display configurations are possible.

A timeserver 55A is preferably located within command and control unit 40 and is configured to synchronize acoustic sensors 31, 32, 33, 34. In an alternative embodiment, a timeserver 55B is located in one sensor, shown here as sensor 31, of the plurality of sensors 30. Although not shown, each of the plurality of acoustic sensors 30 has a timeserver. However, only one of the timeservers on each subnet is active at any given time.

An acoustic signal 136 sent by sensor 31 is also shown. The acoustic signal 136 includes a time stamp 137 and an identification mark 138 along with sound amplitude information 139.

Figure 2:
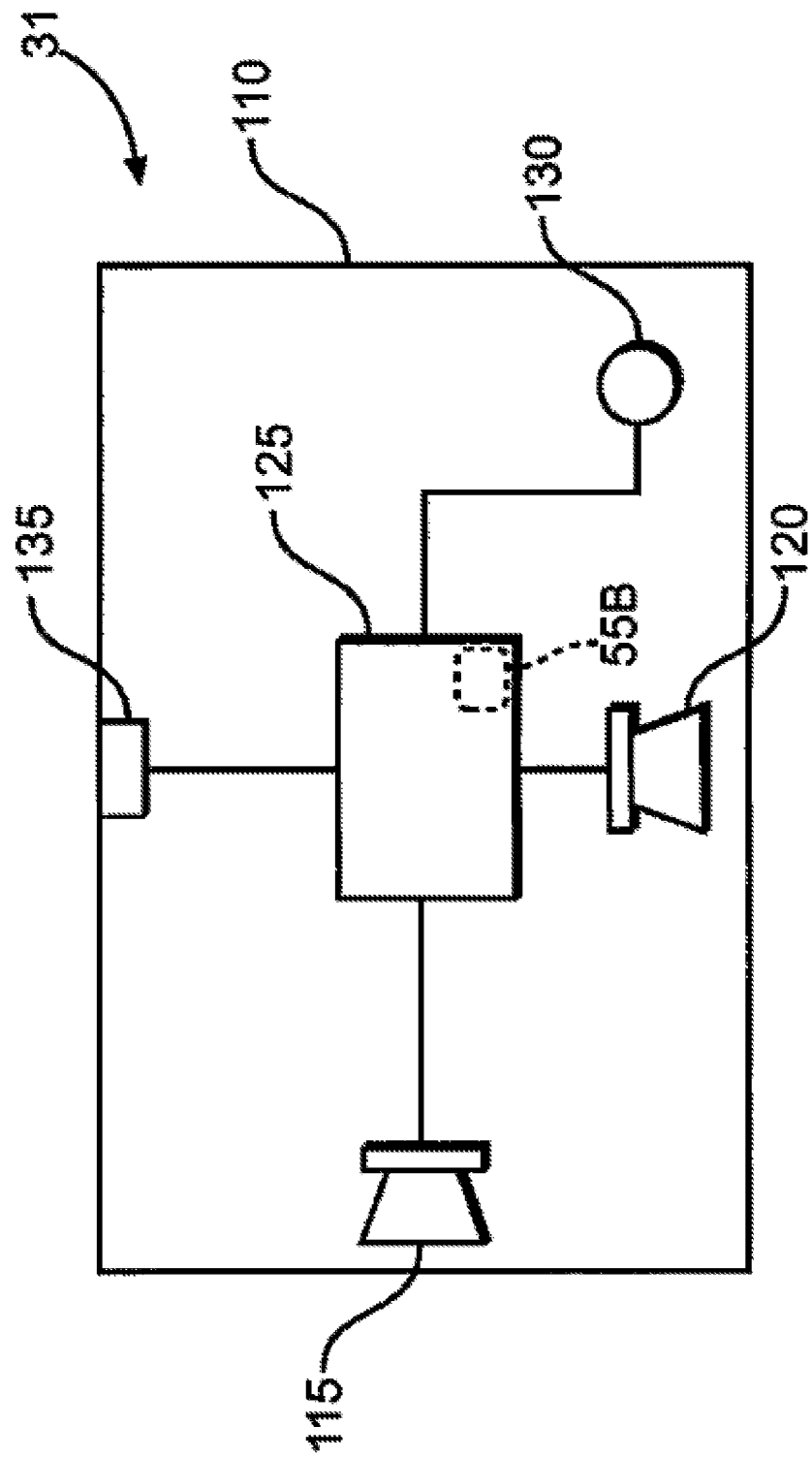
FIG. 2 shows structure associated with a sensor of the system of FIG. 1.

With reference to FIG. 2, sensor 31 from FIG. 1 is shown in more detail. It can be appreciated that sensor 31 is presented as an exemplary embodiment for use in connection with an audible or acoustic system constructed in accordance with the invention.

In the embodiment shown, sensor 31 includes a single computer board 110 including a first microphone 115 and a second microphone 120. As depicted, first and second microphones 115 and 120 are preferably arranged orthogonal to each other and connected to a central processing unit (CPU) 125. The CPU 125 is particularly a multi-core processor for fast signal processing which is electrically powered, such as through a 5V battery 130, a micro USB port or the like. Also provided as part of sensor 31 is a network connector, such as an Ethernet, USB or the like connection port indicated at 135 for connection with communication network 50.

Sensor 31 can send an acoustic signal 136 including a time stamp 137 and an identification mark 138 along with sound amplitude information 139. At this point, it should be noted that sensor 31 could actually take on various forms while functioning and operating in the manner which will be detailed below. Certainly, it should be recognized that sensor 31 could be electrically powered in various ways, including being electrically hardwired, and need not be network hardwired but rather can incorporate a wireless interface. In general, it is important that CPU 125 is capable of sampling acoustic signals received from both microphones 115 and 120, such as at a minimum of 192 KHz.

Several factors have been analyzed to determine the best gauge of when an audible or acoustic event was detected by devices with overlapping coverage. Factors such as relative amplitude, frequency content, duration and time of arrival were all compared and contrasted to identify a correlation between shooter location and best sensor selection. Surprisingly, the time of arrival of the acoustic energy peak at the sensor was found to provide the most reliable discriminator for identifying the detector closest to the audible event. However, determining arrival time is very complicated and it requires the ability to accurately compare times to millisecond accuracy and a real time communications network.

System 10 uses low cost single computer boards 110 as the backbone of sensor 31. This provides a low cost solution that can be affordable at higher sensor densities. The downside to this approach is that system 10 does not have a real time clock. In addition, sensors 31, 32, 33, 34 preferably communicate using a network based on Ethernet (wired or wireless) protocols.

While cost effective, Ethernet was not designed for near real time communications or precise timing. Three separate threads, i.e. a time synchronization thread, an event queuing thread and a buffered event processing thread work together, as described below with reference to FIGS. 3, 4A, 4B and 4C to solve both problems and to provide a solution for precise timing and discrimination of overlapping events.

Figure 3:
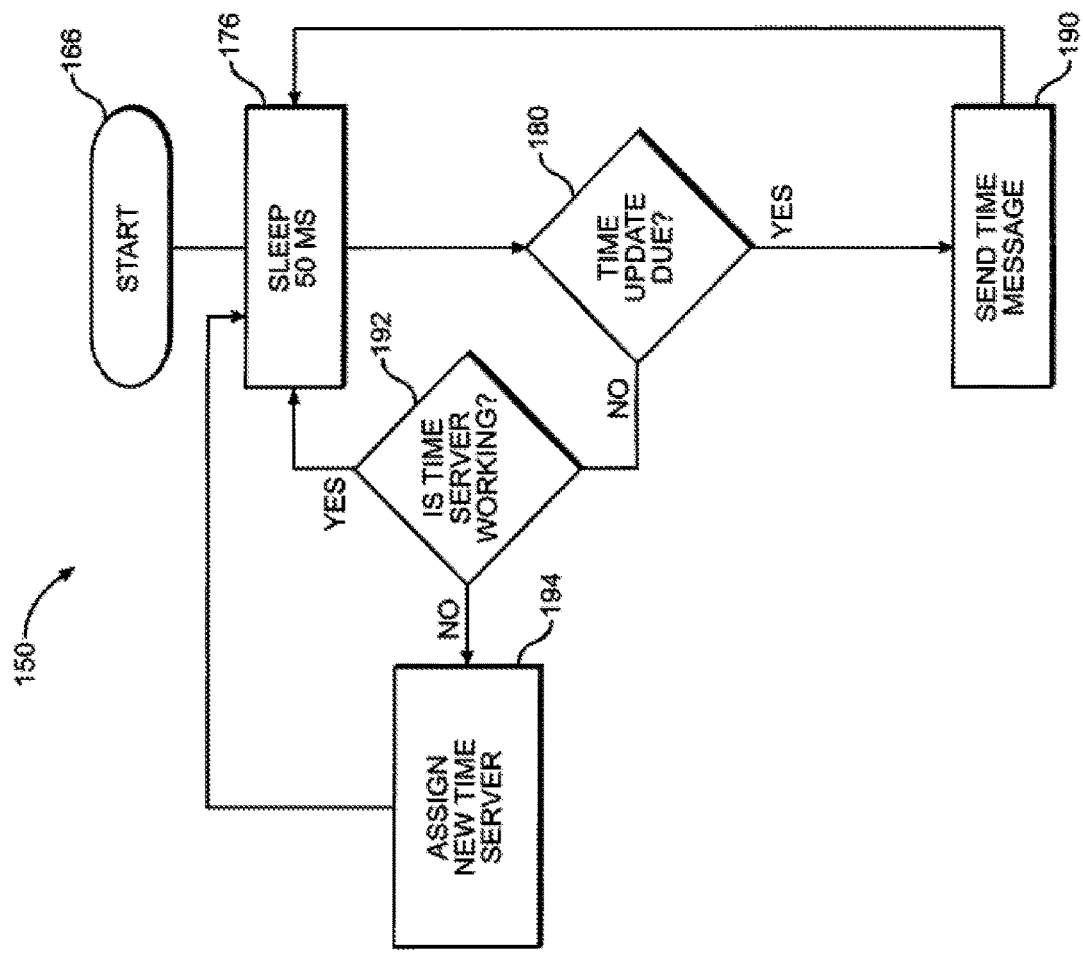
FIG. 3 is a flowchart of a time synchronization algorithm employed in accordance with the invention.

With reference to FIG. 3, there is shown a time synchronization thread 150. The CPU 125 of each sensor 31, 32, 33, 34 includes a software clock. However, the software clocks can become unsynchronized very quickly. Thread 150 starts at step 166. Since the thread does not need to be active continuously, thread 150 sleeps at step 176. Thread 150 then determines at step 180 if a time update is due. If an update is due, a time message is sent at step 190 from timeserver 55A to sensors 31, 32, 33, 34.

Preferably the time message is a User Datagram Protocol (UDP) multicast message sent to all sensors 31, 32, 33, 34. A UDP message is preferable because it is broadcast and the message transports without a retry mechanism. TCP messages, in contrast, have a built in retry mechanism which can cause a delay in transport causing the time message to become "stale" by the time it is received. Using UDP messaging guarantees there is no time delay in sending information and all sensors receive the time message at nearly the same time. Preferably, the delay in processing at step 176 is 50 milliseconds. However, this delay time may be adjusted to adjust the message broadcast frequency based on network congestion and also based on the number of sensors present in system 10.

Referring back to step 180, if a time update is not due, the method at step 192 determines if timeserver 55A is working. If not, a different timeserver 55B is assigned at step 194. It should be noted that command and control unit 40 contains timeserver 55A, which can broadcast the multicast time message. However, in some arrangements there may be a considerable distance from command and control unit 40 and sensors 31, 32, 33, 34 and therefore the command and control unit 40 and sensors 31, 32, 33, 34 may be operating on different subnets.

In the case of network segmentation, it is possible that UDP messages may be prevented from traveling to a different subnet by routers that are set to restrict the transmission of certain types of messages for security reasons. Therefore, when command and control unit 40 recognizes that timeserver 55A is not functioning properly, another timeserver 55B is assigned and starts to broadcast time messages. Since timeserver 55B is on sensor 31, timeserver 55B is on the same subnet as sensors 32, 33, 34.

It should also be noted that only one small subnet is shown in FIG. 1. There could be many more sensors and they could be on numerous subnets. Each subnet is assigned a timeserver. One command and control unit could control numerous groups of sensors, with each group in its own subnet. Any sensor that has not received a time server message in a predetermined time span will broadcast this condition to the command and control unit.

The command and control unit randomly selects one of the other sensors to become a time server. The random nature of the assignment is important because if a sensor is not able to be a time server, the system will simply pick another sensor until the system finds a time server that functions properly. If two or more sensors start acting as time servers within the same subnet, the command and control unit detects this condition and selects one of these sensors to remain the time server, while disabling time server functionality on the other sensors.

Using the above techniques, the system is able to automatically arbitrate time servers without user intervention and can dynamically react to changing network topologies.

Figure 4A:
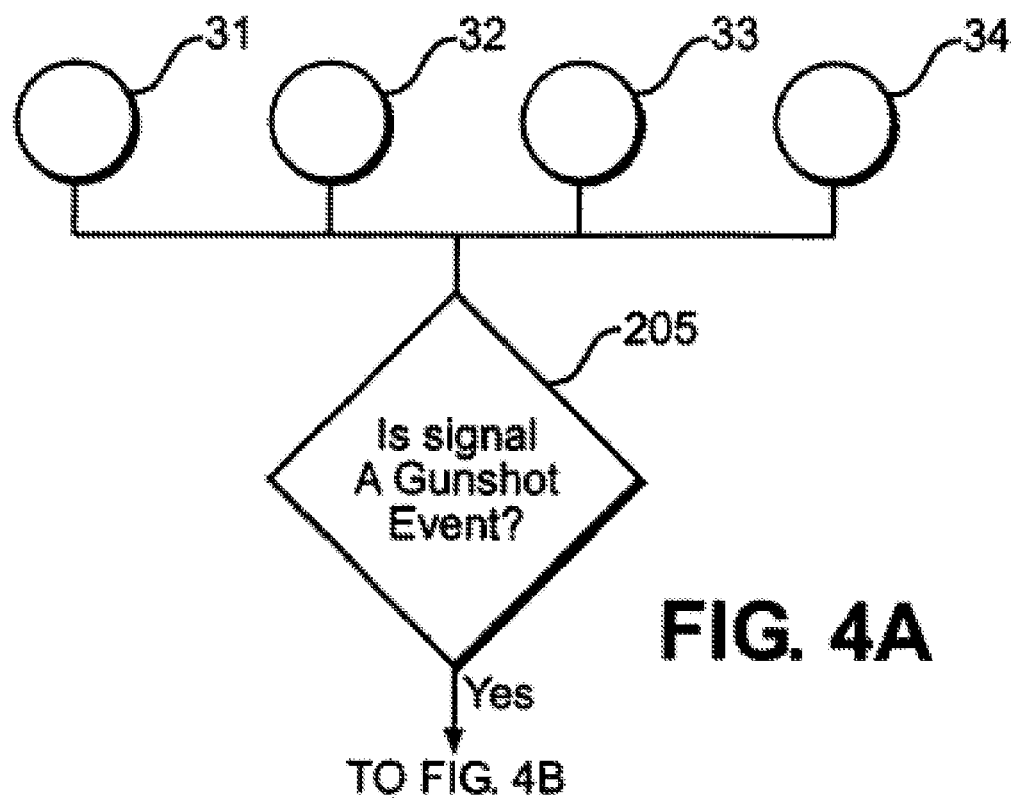
FIG. 4A is a flowchart of events occurring at the sensors in FIG. 1.

Reference will now be made to FIGS. 4A and 4B in describing an exemplary system employing sensors to detect an indoor gunshot. As shown in FIG. 4A, outputs from microphones within sensors 31-34 are initially, continuously analyzed at step 205 for a peak amplitude level large enough to be preliminarily identified as a requisite audible signal, i.e., a gunshot. The identified acoustic events are then processed as described below with reference to FIG. 4B. Basically, since microphone 115 has a low sensitivity, microphone 115 only provides an output for very loud sounds and is essentially deaf to normal, everyday sounds emanating from within the building or structure and therefore will likely not reach a necessary threshold on any noise other than the loudest sounds. By way of example, a typical trigger value would be −5 dBFS (corresponding to a digital value of approximately 18000, based on 16 bit units).

As shown in FIG. 4B, the event queuing thread 151 starts at step 210 by initially identifying an incoming acoustic signal at step 205. If a sound is determined to be relevant, the sensor adds its event data to a list for later processing at step 210. Adding the event data includes, as shown in FIG. 1, adding time stamp 137 to each acoustic signal generated by acoustic sensor 31 in response to an acoustic event, to produce time stamped acoustic signal 136 and sending time stamped acoustic signal 136 through network 50 to command and control unit 40.

Adding data also includes adding a sensor identification mark 138 to each acoustic signal 136 indicating which acoustic sensor 31, 32, 33, 34 produced each acoustic signal 136 and determining a location of a source of the acoustic event based on a location of the sensor that first sensed the acoustic event. Information 139 regarding amplitude of the sensed acoustic event is also present in each acoustic signal 136.

Event queuing begins in thread 151, step 210 when the command and control unit receives an event message from one or more sensors. Normally, an event list at step 210 has no data but the method checks the list, at step 220, every 50 milliseconds, to determine if one of the sensors 31, 32, 33, 34 has added data to the list. If the event list has data at step 230, the process proceeds to a buffer loop at steps 240 and 250 to intentionally delay for a nominal time period to accommodate for Ethernet congestion and message latency. Typically, the nominal time period is less than one second. In examples, the nominal time period might be as small as 100 milliseconds or less, but it could be as large as 500 milliseconds. In other words, once one of the sensors 31-34 sends data as the first event, thread 151 queues up other events from other sensors so the events can all be processed at one time at step 260, as further detailed hereinbelow in FIG. 4C.

Figure 4C:
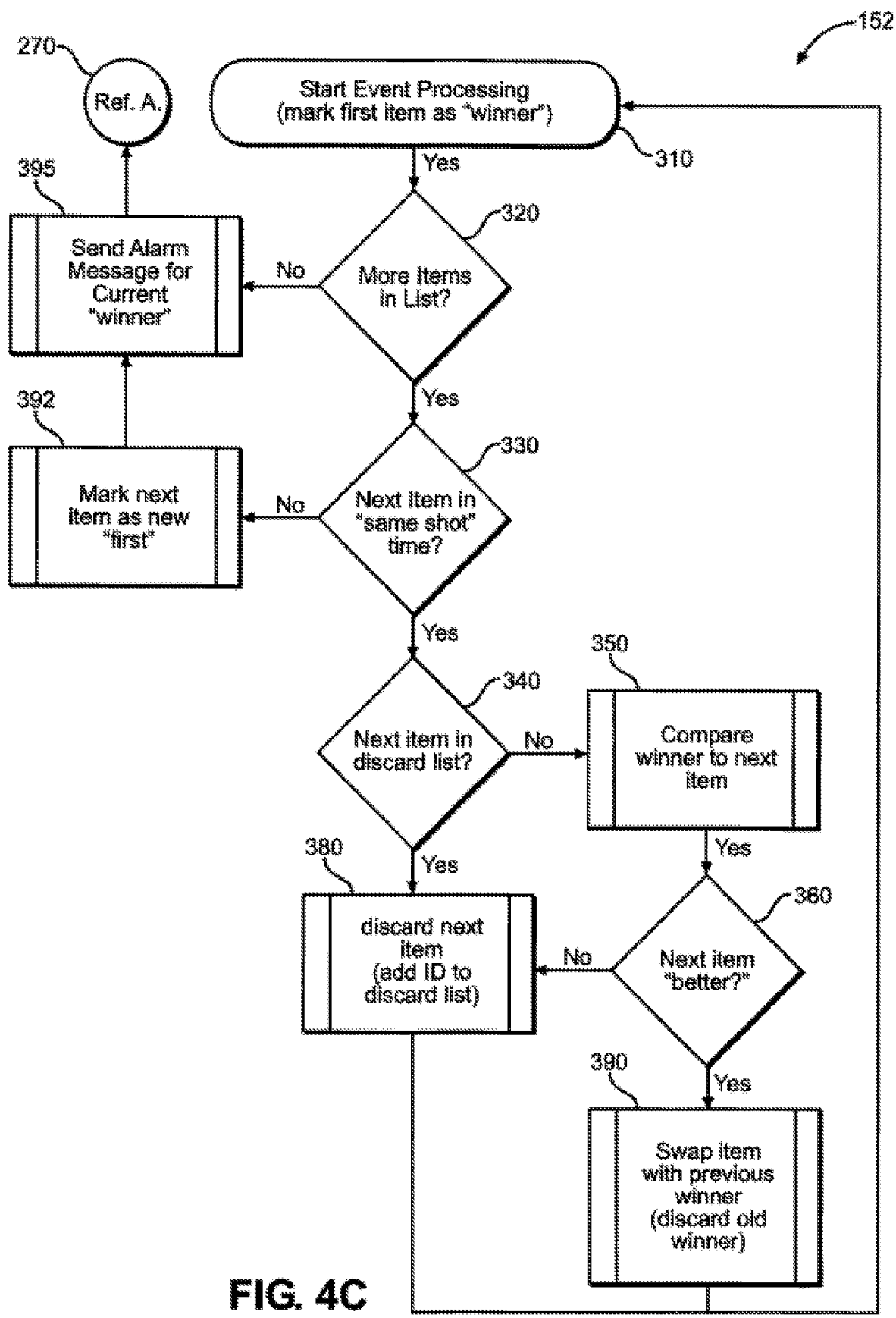
FIG. 4C is a flowchart of a calculation algorithm employed in accordance with the invention.

With reference to FIG. 4C, thread 152 starts sorting time stamped acoustic signals 136 with command and control unit 40 to determine which of the acoustic sensors 31, 32, 33, 34 first sensed the acoustic event. This occurs when buffer loop 240 has developed a list of data including signals from sensors 31, 32, 33, 34 that include time stamp data and sensor data.

Thread 152 starts at step 310 by simply marking the first event in the list as the current "winner". If there are more items in the list, event-processing thread 152 continues to step 320. If the next event in the list is in the same time frame as the previous item at 330, thread 152 continues to step 340.

If the next item is not in the discard list at 340, then the next item is compared to the winner at step 350. More specifically, the time stamps of the various signals are compared and the signal with the earliest time stamp is selected. The process also includes determining if two acoustic signals have time stamps that are close in time and, if so, the amplitudes of the two acoustic signals are compared to determine which of the two acoustic signals has the largest amplitude. In this scenario, the location of the source of the acoustic event will be established based on the location of the acoustic sensor producing the acoustic signal with the largest amplitude.

If the next item is better, i.e., has an earlier time stamp than the last, the next item becomes the new winner and the old winner is added to the discard list at step 390 and thread 152 returns to start at step 310. If, at step 340 the next item is in the discard list, or at step 360 the next item is not better than the current winner, then thread 152 discards the next item at step 380 and returns to start at step 310. If, at step 330 the next item is not in the same shot time, thread 153 sets the next item as a new first item at step 392 and sends an alarm for the current winner at 395. The alarm at 395 is also processed if no more items are in the list at step 320. After step 395, thread 152 ends and thread 151 resumes at step 270.

As shown at step 270 in FIG. 4C, once the events are processed in thread 152, the method returns to the process shown in FIG. 4B.

Upon completion of step 270 in FIG. 4B, if all events are not processed at step 280, thread 151 returns to the buffer loop at step 240; otherwise, thread 151 returns to step 220 to check the event list for another event.

As can be seen from the above, the location of the "winner" sensor is established and thereby an origin of the named event which corresponds to the location of the "winner" sensor is determined in an accurate manner. Therefore, the system and method described above represents an approach for providing a highly reliable, repeatable method for discriminating between multiple detectors registering the same event and selecting the single "winner" sensor. In this manner, the invention compensates for typical problems associated with accurately identifying the origin of a sensed event.

Although described with reference to preferred embodiments of the invention, it should be readily understood that various changes and/or modifications can be made to the invention without departing from the spirit thereof. For example, although the invention has been mainly described with regard to an exemplary embodiment detecting gunshots, the techniques would work with any type of multi-sensor network including multiple sensors which can register a common event. As noted above, other acoustic events, such as car crashes or even arguments, could be detected by the inventive techniques described herein. The system could also be used to identify the location of events based on non-acoustic signals. For example, the system can be employed with motion, seismic or smoke detecting sensors.

Certainly the system may be used for alert purposes, such as alerting emergency personnel, such as building or local jurisdictional personnel of the occurrence of an event, such as a gunshot, car crash, earthquake or the like. Furthermore, the system may be designed to integrate with video management systems, mass notification systems, automatic door locks, as well as sending out mass SMS messages and telephone calls.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of locating an origin of an event with sensors that are connected by a communication network, the method comprising:
    assigning one of the sensors to be a timeserver and producing a time message with the timeserver;
    verifying if the timeserver is functioning and, if the timeserver is not functioning, assigning another one of the sensors to be a new timeserver;
    synchronizing the sensors by broadcasting the time message over the communication network;
    adding a time stamp to each signal, generated by each sensor in response to the event, to produce time stamped signals;
    sending the time stamped signals through the network to a command and control unit;
    sorting the time stamped signals with the command and control unit to identify multiple detections of the same event among the time stamped signals and determine which of the sensors first sensed the event,
    queuing other time stamped signals from other sensors by intentionally delaying processing of received time stamped signals for a time period that is based on number of the sensors within the communication network and network congestion;
    sending an alarm message for the sensor that first sensed the event and
    suppressing alarm messages for other sensors that sensed the event.

2. The method of claim 1, wherein broadcasting the time message includes sending a User Datagram Protocol (UDP) multicast time message.

3. The method according to claim 1, further comprising:
    adding a sensor identification mark to each signal indicating which sensor produced each signal; and
    determining a location of a source of the event based on a location of the sensor that first sensed the event.

4. The method according to claim 3, further comprising:
    when two signals have time stamps indicating that the two signals were generated in response to the same sensed event, comparing amplitudes of the two signals to determine which of the two signals has the largest amplitude; and
    determining the location of the source of the event based on the location of the sensor producing the signal with the largest amplitude.

5. The method according to claim 1, further comprising: determining if the event was an acoustic signal produced by a gunshot.

6. The method of claim 1, further comprising waiting for the time stamped signals to arrive at the command and control unit by intentionally delaying processing of the time stamped signals for a time period that is less than one second.

7. A system for locating an origin of an event within a building or other structure, comprising:
    a plurality of sensors configured to add time stamps to signals generated by each sensor in response to an event, to produce time stamped signals;
    a command and control unit;
    a communications network connecting the sensors and the command and control unit, wherein the sensors are configured to send the time stamped signals through the communications network to the command and control unit; and
    the system assigning one of the sensors to be a timeserver and producing a time message with the timeserver and verifying if the timeserver is functioning and, if the timeserver is not functioning, assigning another one of the sensors to be a new timeserver;
    the timeserver configured to synchronize the sensors by broadcasting a time message over the communications network,
    wherein the command and control unit sorts the time stamped signals to identify multiple detections of the same event among the time stamped signals and determine which of the sensors first sensed the event;
    the system queuing other time stamped signals from other sensors by intentionally delaying processing of received time stamped signals for a time period that is based on number of the sensors within the communication network and network congestion;
    sending an alarm message for the sensor that first sensed the event and
    suppressing alarm messages for other sensors that sensed the event.

8. The system of claim 7, wherein each sensor includes a network port configured to connect to the network and the time message is a UDP multicast time message.

9. The system according to claim 7, wherein each signal includes a sensor identification mark indicating which sensor produced each signal and wherein the command and control unit is further configured to determine a location of a source of the event based on a location of the sensor that first sensed the event.

10. The system according to claim 7, wherein the command and control unit is configured to:
compare amplitudes of two signals having time stamps indicating that the two signals were generated in response to the same sensed event to determine which of the two signals has the largest amplitude; and
determine a location of a source of the event based on a location of the sensor producing the signal with the largest amplitude.

11. The system according to claim 7, wherein the command and control unit is configured to determine if the event was an acoustic signal produced by a gunshot.

12. The system according to claim 7, wherein the command and control unit is configured to wait for the time stamped signals to arrive at the command and control unit by intentionally delaying processing of the time stamped signals for a time period that is less than one second.

13. A system for locating a source of an acoustic event, the system comprising:
sensors that communicate over a communications network, wherein the system assigning one of the sensors to be a timeserver and producing a time message with the timeserver; verifying if the timeserver is functioning and, if the timeserver is not functioning, assigning another one of the sensors to be a new timeserver;
the timeserver that sends time messages over the network to synchronize the sensors, wherein the sensors:
receive the time messages;
sense the event and generate time stamped signals in response to sensing the event, the time stamped signals including time stamps based upon the time messages; and
send the time stamped signals over the network; and
a command and control unit that receives the time stamped signals over the network sent by the sensors and determines which of the sensors first sensed the event,
queues other time stamped signals from other sensors by intentionally delaying processing of received time stamped signals for a time period that is based on number of the sensors within the communication network and network congestion;
identifies multiple detections of the same event among the time stamped signals, and locates the source of the event based on the time stamped signals sent by the sensors;
sends an alarm message for the sensor that first sensed the event and
suppresses alarm messages for other sensors that sensed the event.

14. The system of claim 13, wherein the acoustic event is a gunshot.

15. The system of claim 13, wherein each of the sensors are located in different rooms of a building.

16. The system of claim 13, wherein each of the sensors include two micro electro-mechanical system (MEMS) microphones having different sensitivity levels.

17. The system of claim 13, wherein the time stamped signals include identification marks that indicate which sensors generated the signals.

18. The system of claim 13, wherein the time stamped signals include amplitude information of the event sensed by the sensors.

19. The system of claim 13, wherein:
the communications network has one or more subnets that each include one or more sensors; and
the command and control unit selects one of the sensors within each of the subnets to be a timeserver within each of the subnets.

20. A method for locating a source of an acoustic event, the method comprising:
assigning one of sensors to be a timeserver and producing time messages with the timeserver;
verifying if the timeserver is functioning and, if the timeserver is not functioning, assigning another one of the sensors to be a new timeserver;
the timeserver sending the time messages over a communications network to synchronize sensors on the network, the sensors: receiving the time messages, sensing the event, generating time stamped signals in response to sensing the event, the time stamped signals including time stamps based upon the time messages, and sending the time stamped signals over the network; and
a command and control unit receiving the time stamped signals sent over the network by the sensors, identifying multiple detections of the same event among the time stamped signals, and locating the source of the event based on the time stamped signals sent by the sensors, queuing other time stamped signals from other sensors by intentionally delaying processing of the received time stamped signals for a time period that is based on number of the sensors within the communication network and network congestion;
sending an alarm message for the sensor that first sensed the event and
suppressing alarm messages for other sensors that sensed the event.

21. The method of claim 20, wherein the command and control unit locating the source of the event based on the time stamped signals sent by the sensors comprises:
sorting the time stamped signals to determine which of the sensors first sensed the event; and
locating the source of the event based on a location of the sensor that first sensed the event.

22. The method of claim 21, further comprising sending an alarm message for the sensor that first sensed the event, and suppressing alarm messages for other sensors that sensed the event.

23. The method of claim 21, further comprising configuring the command and control unit to wait for the time stamped signals to arrive by intentionally delaying processing of the time stamped signals for a time period that is less than one second before sorting the time stamped signals.

24. The method of claim 20, wherein the command and control unit locating the source of the event based on the time stamped signals sent by the sensors comprises:
determining that two of the signals have time stamps indicating that the two signals were generated in response to the same sensed event;
determining which of the two signals has the largest amplitude; and
identifying a location of the sensor that produced the signal with the largest amplitude.

25. The method of claim 20, further comprising the sensors determining that the acoustic event is a gunshot.

26. The method of claim 20, further comprising adding an identification mark to each time stamped signal indicating which sensor produced each time stamped signal.

27. A method of locating an origin of an event with sensors that are connected by a communication network, the method comprising:

synchronizing the sensors by broadcasting a User Datagram Protocol (UDP) multicast time messages over the network;

generating time stamped signals by adding to each signal generated by each sensor in response to each event a time stamp based on the time messages and a sensor identification mark indicating which sensor produced the signal;

sending the time stamped signals through the network to a command and control unit;

upon receiving a first time stamped signal from a sensor, queuing other time stamped signals from other sensors by intentionally delaying processing of received time stamped signals for a time period that is between 100 and 500 milliseconds;

processing the time stamped signals with the command and control unit, including identifying different events and multiple detections of the same event among the time stamped signals based on whether or not the time stamps indicate that the time stamped signals were generated in response to the same event, and, for each identified event, among the multiple detections identified for that particular event, selecting a time stamped signal with the earliest time stamp, and suppressing alarm messages for any non-selected time stamped signals by discarding the non-selected time stamped signals and sending alarm messages only for the selected time stamped signals; and determining a location of a source of each event based on a location of a sensor that produced the selected time stamped signal for that particular event.

28. The method of claim 27, further comprising assigning one of the sensors to be a timeserver that produces the time messages, verifying if the timeserver is functioning, and, if the timeserver is not functioning, randomly assigning another one of the sensors to be a new timeserver, wherein the communications network has one or more subnets that each include one or more sensors, and the command and control unit selects one of the sensors within each of the subnets to be a timeserver within each of the subnets.

\* \* \* \* \*